(12) United States Patent
Esswie et al.

(10) Patent No.: US 12,238,048 B2
(45) Date of Patent: Feb. 25, 2025

(54) RADIO FRAME CONFIGURATION FOR DYNAMIC COORDINATED TDD

(71) Applicant: NOKIA TECHNOLOGIES OY, Espoo (FI)

(72) Inventors: Ali Esswie, Aalborg (DK); Klaus Ingemann Pedersen, Aalborg (DK)

(73) Assignee: Nokia Technologies Oy, Espoo (FI)

( * ) Notice: Subject to any disclaimer, the term of this patent is extended or adjusted under 35 U.S.C. 154(b) by 718 days.

(21) Appl. No.: 17/250,798

(22) PCT Filed: Oct. 11, 2018

(86) PCT No.: PCT/EP2018/077697
§ 371 (c)(1),
(2) Date: Mar. 4, 2021

(87) PCT Pub. No.: WO2020/074079
PCT Pub. Date: Apr. 16, 2020

(65) Prior Publication Data
US 2021/0351904 A1 Nov. 11, 2021

(51) Int. Cl.
*H04L 5/22* (2006.01)
*H04W 24/02* (2009.01)
(Continued)

(52) U.S. Cl.
CPC .............. *H04L 5/22* (2013.01); *H04W 24/02* (2013.01); *H04W 72/0446* (2013.01); *H04W 72/27* (2023.01)

(58) Field of Classification Search
None
See application file for complete search history.

(56) References Cited

U.S. PATENT DOCUMENTS

| | | | | |
|---|---|---|---|---|
| 2014/0016549 | A1* | 1/2014 | Novlan | H04B 7/0479 370/328 |
| 2017/0331661 | A1* | 11/2017 | Yang | H04L 25/021 |

(Continued)

OTHER PUBLICATIONS

International Search Report and Written Opinion for International Application No. PCT/EP2018/077697, mailed on Jul. 15, 2019, 15 pages.

(Continued)

*Primary Examiner* — Andre Tacdiran
(74) *Attorney, Agent, or Firm* — Barta Jones, PLLC

(57) ABSTRACT

Slave units of a mobile communication system each determine (S907), out of a predefined sliding codebook of Q unique radio frame configurations, a radio frame configuration for communicating with user equipments, and transmit (S907), to a master unit of a cluster which the slave units belong to, a request to use the determined radio frame configuration. The predefined sliding codebook comprises sub-codebooks each grouping together radio frame configurations of the Q unique radio frame configurations, that share the same downlink-to-uplink subframe ratio but with a phase offset of the radio frame configurations. The master unit identifies (S909) a common sub-codebook out of the sub-codebooks of the predefined sliding codebook, that comprises most of the determined radio frame configurations indicated in the requests received from the slave units, and, for each of the determined radio frame configurations, selects (S911, S915, S917, S921) a radio frame configuration out of the Q unique radio frame configurations, that corresponds to a sub-codebook of the determined radio frame configuration and minimizes an average misalignment with a radio frame configuration of the common sub-codebook.

10 Claims, 14 Drawing Sheets

(51) Int. Cl.
*H04W 72/0446* (2023.01)
*H04W 72/27* (2023.01)

(56) References Cited

U.S. PATENT DOCUMENTS

2018/0279334 A1 9/2018 Lim et al.
2020/0374045 A1* 11/2020 Yin .................... H04B 7/0456

OTHER PUBLICATIONS

3GPP TSG-RAN WG1#NR, R1-1701146; "Dynamic TDD Interference Mitigation Concepts in NR"; Agenda item: 5.1.7.2; Source: Nokia, Alcatel-Lucent Shanghai Bell; Spokane, Washington, USA; Jan. 16-20, 2017; 6 pages.

3GPP TSG-RAN WG1 AH_NR Meeting, R1-1701128; "Performance of Dynamic TDD at 30 GHz"; Agenda Item: 5.1.7.1; Source: Ericsson; Spokane, Washington, USA; Jan. 16-20, 2017; 12 pages.

3GPP TSG-RAN WG1#89, R1-1708820; "XN Support to Aid TDD Interference Mitigation and Coordination", Agenda Item: 7.1.6.1; Source: Nokia, Alcatel-Lucent Shanghai Bell; Hangzhou, P.R. China; May 15-19, 2017; 6 pages.

Lukowa et al., "Performance of Strong Interference Cancellation in Flexible UL/DL TDD Systems Using Coordinated Muting, Scheduling and Rate Allocation"; IEEE Wireless Conference and Networking Conference (WCNC 2016) Track 1: PHY and Fundamentals; Doha, Qatar, Apr. 3-6, 2016; 7 pages.

Venkatasubramanian et al., "On the Performance Gain of Flexible UL/DL TDD with Centralized and Decentralized Resource Allocation in Dense 5G Deployments", IEEE 25th Annual International Symposium on Personal, Indoor, and Mobile Radio Communication (PIMRC); Washington, DC; Sep. 2-5, 2014; pp. 1840-1845.

* cited by examiner

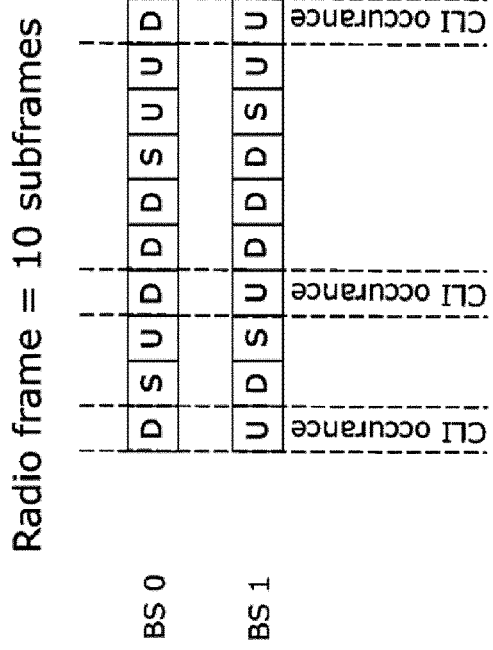
Fig. 1
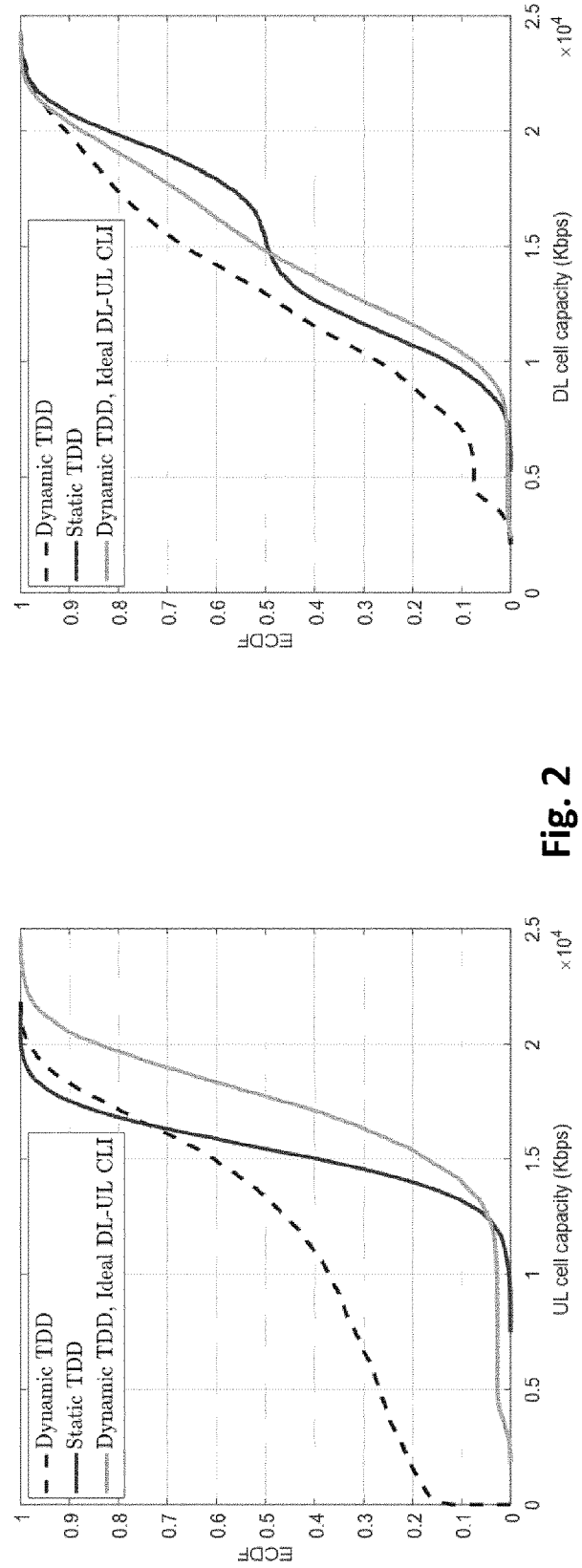
Fig. 2
Fig. 3

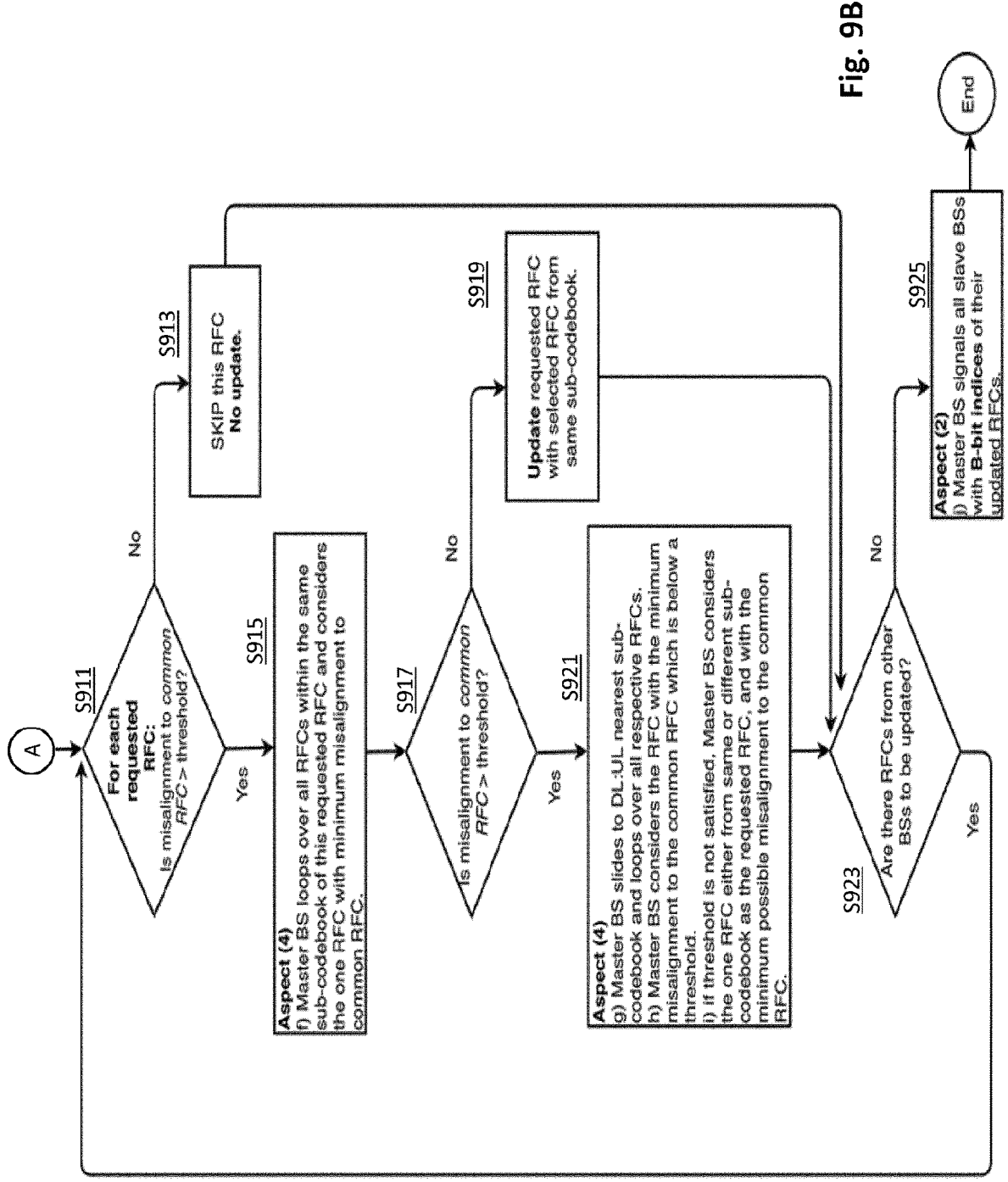

Table 1

| Parameter | Value |
|---|---|
| Environment | 3GPP-UMA, 7 BSs, 21 cells, 500 ISD |
| Channel bandwidth & duplexing | 10 MHz, dynamic TDD |
| Antenna setup | BS: ULA 8 × 1 – UE: ULA 2 × 1 |
| Receiver | Standard LMMSE-IRC |
| TTI setup | Long TTI: 1 ms (14-OFDM symbols) |
| TDD mode | Synchronized across all BSs |
| RFC update periodicity | A single radio frame = 10 subframes |
| Link direction selection criteria | Traffic based |
| Subframe misalignment threshold | 3 |
| Traffic model | FTP3 with Poisson point arrival (UL and DL) |
| Packet size (file size) $Z$ | (500 Bytes * 8) bits |
| Arrival rate $\lambda$ | DL: 500/325/250 packet/sec<br>UL: 500/325/250 packet/sec |
| Average users per cell $K$ | 10 average users/cell, uniformly distributed |
| Traffic ratio / offered average load per cell. | DL:UL = 2:1 (20Mbps:10Mbps)<br>DL:UL = 1:1 (15Mbps:15Mbps)<br>DL:UL = 1:2 (10Mbps:20Mbps) |

Fig. 11

Table 2

| Ratio | Load (Mbps) | FDNC | | Proposed RFCbCB | | UL-ideal PDUCC | |
|---|---|---|---|---|---|---|---|
| | | DL | UL | DL | UL | DL | UL |
| DL:UL = 2:1 | 20 / 10 | 1538.13<br>0.0% | 55.695<br>0.0% | 1524.35<br>-0.89% | 436.099<br>+154.7% | 1555.42<br>+1.1% | 751.202<br>+172.3% |
| DL:UL = 1:1 | 15 / 15 | 1097.49<br>0.0% | 421.883<br>0.0% | 1135.01<br>+3.36% | 1031.19<br>+83.86% | 1193.63<br>+8.39% | 1106.18<br>+89.56% |
| DL:UL = 1:2 | 10 / 20 | 916.508<br>0.0% | 798.924<br>0.0% | 817.255<br>-11.44% | 1484.89<br>+60.07% | 960.294<br>+4.66% | 1634.62<br>+68.68% |

Fig. 12

Table 3

| Coordination Technology | DL-to-UL CLI instances, Normalized to FDNC |
|---|---|
| No coordination - FDNC | 1 |
| Proposed RFCbCB-1 Slide only within same RFC sub-codebook | 0.2964 |
| Proposed RFCbCB-2 Slide within same/different RFC sub-codebook(s) | 0.000038 |
| UL-ideal PDUCC | 0 |

Fig. 15

RADIO FRAME CONFIGURATION FOR DYNAMIC COORDINATED TDD

CROSS-REFERENCE TO RELATED APPLICATIONS

This application is a national stage entry of International Application No. PCT/EP2018/077697, filed Oct. 11, 2018, entitled "RADIO FRAME CONFIGURATION FOR DYNAMIC COORDINATED TDD" which is hereby incorporated by reference in its entirety.

TECHNICAL FIELD

At least some embodiments relate to a radio frame configuration for dynamic coordinated time division duplexing (TDD).

BACKGROUND

Currently, standardization activities of next fifth generation (5G) of mobile technology is progressively evolving. As conventional 4G networks, 5G new radio (NR) supports both frequency and time division duplexing (FDD, TDD) modes. Benefits of TDD communication for 5G NR over FDD are minimized costs, e.g., less needed RF modules, lower bandwidth, and lower transmission power. Furthermore, TDD mode enables massive multi-antenna communications over 5G NR, e.g., massive multi-input multi output, beamforming, and adaptive antenna systems, due to the achievable channel reciprocity.

However, a massive amount of applications with diverse quality of service (QoS) requirements is required to be sufficiently delivered over the 5G NR, leading to highly sparse and asymmetric downlink (DL) and uplink (UL) traffic demands. Thus, dynamic TDD operation becomes vital, where the radio frame configuration (RFC) of each base station (BS) is adaptively changed in time to cope with its instantaneous traffic demands. That is, each BS independently changes its DL-to-UL subframe ratio within a radio frame according to its traffic ratio. However, such operation introduces an additional type of inter-cell cross-link interference (CLI), i.e., UL-DL, and DL-UL. In macro deployments, CLI is a critical issue and should be either carefully pre-mitigated or post-cancelled. For example, due to the power difference between DL and UL in macro setups, DL-heavy BSs can fully destroy the transmissions of adjacent UL-heavy BSs, leading to significantly degraded UL capacity. In that sequel, coordination schemes among BSs have been developed to counteract the CLI in dynamic TDD; however, these come with a significant signaling overhead, extensive CLI user measurements and highly complex implementation.

CITATION LIST

[1] R1-1701146, Dynamic TDD Interference Mitigation Concepts in NR, Nokia, Alcatel-Lucent Shanghai Bell, 3GPP RAN1 #88, February 2017.
[2] R1-1708820, Xn Support to aid TDD Interference Mitigation and Coordination, Nokia, Alcatel-Lucent Shanghai Bell, 3GPP RAN1 #89, May 2017.
[3] R1-1701128, Performance of Dynamic TDD at 30 GHz, Ericsson, January 2017.
[4] A. Łukowa and V. Venkatasubramanian, "Performance of strong interference cancellation in flexible UL/DL TDD systems using coordinated muting, scheduling and rate allocation," 2016 IEEE Wireless Communications and Networking Conference, Doha, 2016, pp. 1-7.
[5] V. Venkatasubramanian, M. Hesse, P. Marsch and M. Maternia, "On the performance gain of flexible UL/DL TDD with centralized and decentralized resource allocation in dense 5G deployments," 2014 IEEE 25th Annual International Symposium on Personal, Indoor, and Mobile Radio Communication (PIMRC), Washington, D.C., 2014, pp. 1840-1845.
[6] K. Lee, Y. Park, M. Na, H. Wang and D. Hong, "Aligned Reverse Frame Structure for Interference Mitigation in Dynamic TDD Systems," in IEEE Transactions on Wireless Communications, vol. 16, no. 10, pp. 6967-6978, October 2017.

Coordination schemes of fully dynamic TDD systems according to references [1] to [6] are briefly described below.

In [1], a perfect DL-to-UL CLI cancellation method is proposed using full packet exchange. DL-heavy BSs signal adjacent UL-heavy BSs with DL data payloads, precoding information, timing information, modulation and coding information, scheduling decisions, etc. Thus, these UL-heavy BSs can perfectly cancel the DL-to-UL CLI, achieving highly improved UL and DL capacity; however, with a significant control signaling overhead over Xn interface.

In [2], a network-based UL-DL coordination scheme is proposed. Therein, BSs start by a common RFC across an entire cluster, i.e., static TDD. When a BS demands an RFC change, it signals all BSs within the cluster by an RFC change request. If all BSs agree, then, the request is accepted and all BSs switch to the updated RFC, i.e., still static TDD. If at least one BS rejects such request, the requesting BS only changes to the desired RFC and ALL BSs in the cluster periodically start to monitor the CLI measurements. If the detected CLI levels exceeded a predefined threshold, all BSs fall back to static TDD with the common RFC. Thus, the CLI levels should be limited at all times, however, with a significantly reduced RFC flexibility, large signaling overhead across Xn interface, as well as the need for periodic CLI user measurements over the radio control channels.

In [3], a hybrid TDD coordination scheme is proposed, where BSs dynamically switch among static and dynamic TDD modes based on the detected CLI level. If the CLI level passes a threshold, all BSs switch back to the same static TDD RFC. Thus, the CLI is always minimized; however, with extremely limited RFC flexibility in addition to the requirement of high quality CLI user measurements.

In [4, 5], coordinated cell muting and rate allocation between all BSs in a cluster is suggested to eliminate the major CLI aggressor BSs/PRBs and hence, achieve a better decoding ability in both UL and DL directions. However, this comes at the expense of capacity regions, i.e., some BSs may be muted over several subframes, and significant amount of control overhead to globally publicize the BS individual scheduling decisions across the cluster.

In [6], a coordinated aligned reverse frame structure is proposed, where BSs are grouped in pairs. Each BS selects an RFC that needs to be fully reversed to the other BS in this pair. Thus, biasing the dynamic TDD system to more DL-to-UL CLI occurrences than the UL-to-DL ones. Then, a coordinated DL-to-UL CLI cancelation can be adopted at all BSs using advanced non-linear receivers and sophisticated coordination. However, the requirement of the fully-reversed frame structures of each two adjacent BSs sets a critical restriction on the TDD RFC flexibility, i.e., two adjacent BSs may not originally select exactly the same RFC but with reverse order.

LIST OF ABBREVIATIONS 5G fifth generation
BS base station
CLI cross link interference
CU centralized unit
DL downlink
DU distributed unit
ECDF empirical cumulative distribution function
eMBB enhanced mobile broadband
FDD frequency division duplexing
FDNC fully dynamic and non-coordinated TDD
MAC medium access control
NR new radio
OAM operation, administration and management
PDUCC perfect DL-to-UL CLI cancellation
PRB physical resource block
QoS quality of service
RFC radio frame configuration
RFC-CB RFC codebook
RFCbCB RFC-based sliding codebook
TCP transmission control protocol
TDD time division duplexing
TTI transmission time interval
UDP user datagram protocol
UL uplink
URLLC ultra-reliable low-latency communication

SUMMARY

At least some embodiments aim at solving the above problems, and provide for a sliding radio frame configuration for dynamic coordinated TDD with limited signaling overhead in a 5G new radio communication system.

According to at least some embodiments, an opportunistic dynamic TDD coordination scheme is proposed, which significantly improves achievable cell capacity by pre-mitigating potential CLI occurrences.

An implementation example of the proposed coordination scheme affects a medium access control (MAC) scheduler, and requires very limited signaling overhead between participating BSs, e.g. B-bit signaling.

An example embodiment of the proposed coordination scheme demands neither CLI user measurements nor advance knowledge of the scheduling decisions.

At least some embodiments of the proposed coordination scheme offer a reliable performance regardless of the offered traffic load, and high RFC adaptation flexibility such that the CLI is always minimized and overall capacity is always at maximum possible.

According to at least some embodiments, apparatuses, methods and non-transitory computer-readable media are provided, as indicated in the appended claims.

According to an aspect, an apparatus of a mobile communication system, is provided, the apparatus comprising at least one processor and at least one memory including computer program code, the at least one memory and the computer program code configured to, with the at least one processor, cause the apparatus at least to perform:
  determining, out of a predefined sliding codebook of Q unique radio frame configurations, a radio frame configuration for communicating with user equipments,
  wherein each of the Q unique radio frame configurations comprises subframes for downlink communication with the user equipments and subframes for uplink communication with the user equipments, and
  wherein the predefined sliding codebook comprises sub-codebooks each grouping together radio frame configurations of the Q unique radio frame configurations, that share the same downlink-to-uplink subframe ratio but with a phase offset of the radio frame configurations; and
  transmitting, to a master unit of a cluster which the apparatus belongs to, a request to use the determined radio frame configuration, wherein the request indicates the determined radio frame configuration.

According to an example embodiment, the at least one memory and the computer program code are configured to, with the at least one processor, cause the apparatus to further perform:
  receiving, from the master unit of the cluster, a response indicating, out of the predefined sliding codebook, an updated radio frame configuration to be used by the apparatus for communicating with the user equipments instead of the determined radio frame configuration.

According to an example embodiment, the determining comprises determining the radio frame configuration based on at least one of instantaneous traffic demands of the apparatus and a link direction selection algorithm.

According to an example embodiment, the determined radio frame configuration is requested to be used during the next time period until re-performing the determining, and the updated radio frame configuration is to be used during the next time period until re-performing the determining.

According to an example embodiment, the determined radio frame configuration is indicated by an index of $B=\log_2 Q$ bits.

According to an example embodiment, the updated radio frame configuration is indicated by an index of $B=\log_2 Q$ bits.

According to an example embodiment, the time period comprises at least one of a transmission time interval and multiples of a radio frame duration.

According to an example embodiment, the determining is re-performed due to changed traffic load at the apparatus.

According to an example embodiment, the transmitting comprises transmitting the request via at least one of an Xn interface and an F1 interface.

According to an example embodiment, the receiving comprises receiving the response via at least one of an Xn interface and an F1 interface.

According to an example embodiment, the apparatus is at least one of a base station and a distributed unit according to a fifth generation new radio communication system.

According to another aspect, an apparatus of a mobile communication system is provided, the apparatus comprising at least one processor and at least one memory including computer program code, the at least one memory and the computer program code configured to, with the at least one processor, cause the apparatus at least to perform:
  receiving, from each slave unit of a plurality of slave units of the mobile communication system, which belong to a cluster of the apparatus, a request to use a radio frame configuration determined by the slave unit for communicating with user equipments,
  wherein the determined radio frame configuration is indicated in the request and is one of Q unique radio frame configurations included in a predefined sliding codebook,
  wherein each of the Q unique radio frame configurations comprises subframes for downlink communication with the user equipments and subframes for uplink communication with the user equipments, and wherein the predefined sliding codebook comprises sub-codebooks each grouping together radio frame configurations of the Q unique radio frame configurations, that share the same downlink-to-uplink subframe ratio but with a phase offset of the radio frame configurations;

identifying a common sub-codebook out of the sub-codebooks, that comprises most of the determined radio frame configurations indicated in the requests received from the plurality of slave units; and for each of the determined radio frame configurations indicated in the requests received from the plurality of slave units, selecting a radio frame configuration out of the Q unique radio frame configurations, that corresponds to a sub-codebook of the determined radio frame configuration and minimizes an average misalignment with a radio frame configuration of the common sub-codebook.

According to an example embodiment, the at least one memory and the computer program code are configured to, with the at least one processor, cause the apparatus to further perform:

based on the selected radio fame configuration, transmitting a response to the request indicating the determined radio frame configuration, wherein the response indicates an updated radio frame configuration to be used for communicating with the user equipments instead of the determined radio frame configuration.

According to an example embodiment, the identifying further comprises identifying a common radio frame configuration included in the common sub-codebook, that corresponds to most of the determined radio frame configurations indicated in the requests received from the plurality of slave units, and the radio frame configuration of the common sub-codebook is the common radio frame configuration.

According to an example embodiment, the selecting comprises calculating an average misalignment between the determined radio frame configuration and the radio frame configuration of the common sub-codebook, and the at least one memory and the computer program code are configured to, with the at least one processor, cause the apparatus to further perform:

in case the average misalignment between the determined radio frame configuration and the radio frame configuration of the common sub-codebook does not exceed a first predetermined threshold, not transmitting a response to the request indicating the determined radio frame configuration.

According to an example embodiment, the selecting further comprises:

in case the average misalignment between the determined radio frame configuration and the radio frame configuration of the common sub-codebook exceeds the first predetermined threshold, selecting a radio frame configuration of the sub-codebook of the determined radio frame configuration, that minimizes an average misalignment with the radio frame configuration of the common codebook; and in case an average misalignment between the selected radio frame configuration of the sub-codebook of the determined radio frame configuration and the radio frame configuration of the common codebook does not exceed the first predetermined threshold, updating the determined radio frame configuration with the selected radio frame configuration of the sub-codebook of the determined radio frame configuration, and the at least one memory and the computer program code are configured to, with the at least one processor, cause the apparatus to further perform:

transmitting a response to the request indicating the determined radio frame configuration, the response indicating, as updated radio frame configuration, the selected radio frame configuration of the sub-codebook of the determined radio frame configuration.

According to an example embodiment, the selecting further comprises in case the minimized average misalignment between the selected radio frame configuration of the sub-codebook of the determined radio frame configuration and the radio frame configuration of the common codebook exceeds the first predetermined threshold, selecting a radio frame configuration of a sub-codebook near the sub-codebook of the determined radio frame configuration with respect to the downlink-to-uplink subframe ratio, that minimizes an average misalignment with the radio frame configuration of the common codebook; and in case an average misalignment between the selected radio frame configuration of the near sub-codebook and the radio frame configuration of the common codebook does not exceed a second predetermined threshold, updating the determined radio frame configuration with the selected radio frame configuration of the near sub-codebook, and the at least one memory and the computer program code are configured to, with the at least one processor, cause the apparatus to further perform:

transmitting a response to the request indicating the determined radio frame configuration, the response indicating, as updated radio frame configuration, the selected radio frame configuration of the near sub-codebook.

According to an example embodiment, the selecting further comprises in case the average misalignment between the selected radio frame configuration of the near sub-codebook and the radio frame configuration of the common codebook exceeds the second predetermined threshold, updating the determined radio frame configuration either with the selected radio frame configuration of the sub-codebook of the determined radio frame configuration or with the selected radio frame configuration of the near sub-codebook, that minimizes an average misalignment with the radio frame configuration of the common codebook, and the at least one memory and the computer program code are configured to, with the at least one processor, cause the apparatus to further perform:

transmitting a response to the request indicating the determined radio frame configuration, the response indicating, as updated radio frame configuration, either the selected radio frame configuration of the sub-codebook of the determined radio frame configuration or the selected radio frame configuration of the near sub-codebook, that minimizes an average misalignment with the radio frame configuration of the common codebook.

According to an example embodiment, the near sub-codebook comprises a sub-codebook nearest to the sub-codebook of the determined radio frame configuration with respect to the downlink-to-uplink subframe ratio.

According to an example embodiment, the first threshold and the second threshold are different from each other.

According to an example embodiment, the updated radio frame configuration is to be used during the next time period until re-performing the determining.

According to an example embodiment, the updated radio frame configuration is indicated by an index of $B=\log_2 Q$ bits.

According to an example embodiment, the time period comprises at least one of a transmission time interval and multiples of a radio frame duration.

According to an example embodiment, the transmitting comprises transmitting the response via at least one of an Xn interface and an F1 interface.

According to an example embodiment, the receiving comprises receiving the request via at least one of an Xn interface and an F1 interface.

According to an example embodiment, the apparatus is at least one of a base station and a central unit according to a fifth generation new radio communication system.

In the following, example embodiments and example implementations will be described with reference to the accompanying drawings.

BRIEF DESCRIPTION OF THE DRAWINGS

FIG. 1 shows a diagram illustrating subframes of radio frames, for explaining CLI occurrence in dynamic TDD.

FIG. 2 shows a diagram illustrating UL capacity performance of different TDD configuration schemes.

FIG. 3 shows a diagram illustrating DL capacity performance of different TDD configuration schemes.

FIGS. 9A and 9B show a flowchart illustrating a process of a coordination scheme according to an example embodiment.

FIG. 11 shows a table illustrating simulation parameters.

FIG. 12 shows a table illustrating DL and UL capacity performance with UDP (Mbps).

FIG. 15 shows a table illustrating normalized DL-to-UL CLI instances with UDP, DL:UL=2:1.

DESCRIPTION OF THE EMBODIMENTS

Figure 5:
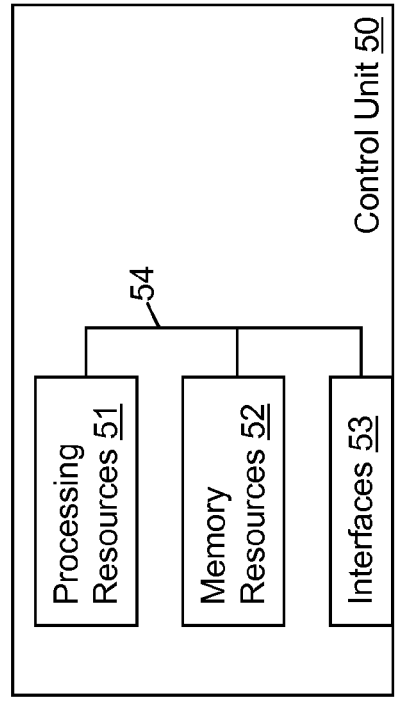
FIG. 5 shows a schematic block diagram illustrating a configuration of a control unit in which examples of embodiments are implementable.

According to at least some embodiments, a standard dynamic TDD system model over 5G NR is assumed, where each BS independently selects its RFC based on its current traffic demands. An RFC comprises 10 subframes, each is 1 ms. Each RFC is divided into two equally-sized half-frames of five subframes, each with half-frame-0 comprising subframes 0-4 and half-frame-1 comprising subframes 5-9. A subframe comprises 14 OFDM symbols for cases with normal cyclic prefix, while it equals only 12 OFDM symbols for the case with extended cyclic prefix and subcarrier spacing of 60 kHz. The number of slots per subframe/radio frame depends on the subcarrier spacing. For 15 kHz subcarrier spacing, there is one slot per subframe, for 30 kHz there are two slots per subframe, for 60 kHz there are four slots per subframe, and so forth. There is a large number of possible slot formats. FIG. 1 shows two radio frames each comprising 10 subframes, where "D" indicates downlink symbol, "U" indicates uplink symbol, and "S" is flexible. Hence, "S" could refer to muting or be used for downlink or uplink transmission. As an example, slot format 0 and 1 corresponds to downlink-only and uplink-only slots, respectively. Other slot formats include cases with DL transmissions, and guard period (i.e. unused symbols), and UL symbols. So equivalent to special subframes as known from LTE.

The 5G NR flexible frame structure allows for both short and long transmission time intervals (TTIs), hence, it is applicable to both enhanced mobile broadband (eMBB) and ultra-reliable low-latency communication (URLLC) QoS classes. The former is facilitated by allowing both mini-slot transmission of e.g. 2-symbols to/from particular users, and full slot transmissions, or TTIs of aggregated slots.

If BSs do not use exactly the same RFC, adjacent BSs will experience different transmission directions over several subframes, causing severe CLI, as shown by the example in FIG. 1. In the example shown in FIG. 1, CLI occurs between subframes #0, #3 and #7 of base station BS0 and base station BS1.

Accordingly, the lower-power UL transmissions will be severely degraded due to the strong CLI resulting from adjacent larger-power DL transmissions. As a result, the achievable UL capacity exhibits a significant loss, leading to more buffered UL traffic in those victim BSs. Hence, these BSs will be dictated by new and buffered UL traffic leading to a limited DL capacity and highly degraded overall spectral efficiency as a consequence.

To further illustrate the addressed problem, FIGS. 2 and 3 show the empirical cumulative distribution function (ECDF) of the achievable UL and DL capacity, respectively, for the fully dynamic TDD, fully static TDD (one RFC is pre-configured for all BS), and the fully dynamic TDD with ideal DL-to-UL CLI (perfect DL to UL CLI cancellation is assumed). Those results are obtained from 3GPP NR compliant macro-cellular advanced dynamic system level simulations with a Poisson arrival bursty traffic models for both link directions. As can be noticed, for a DL heavy system, i.e., DL:UL traffic ratio=2:1, the UL capacity of the fully dynamic TDD is severely degraded and becomes even worse than the static TDD case. This also results in capacity starvation in the DL direction, as the system will be overwhelmed by retransmitted and buffered UL traffic, thus, even further worse DL capacity is achieved.

On another side, if the DL to UL CLI is assumed perfectly cancelled, a highly improved UL capacity is achieved leading to more time and resources for DL transmissions accordingly, and hence, an improved DL and overall cell capacity can be achieved.

In conclusion, the capacity gain from the RFC flexibility offered by the fully dynamic TDD systems can fully vanish due to the severe CLI, especially the DL-to-UL CLI.

At least some embodiments address the problem of how to most efficiently coordinate macro BSs in a flexible TDD system along with limited inter-gNB Xn signaling overhead; such that the CLI is always guaranteed at minimum while simultaneously maximizing the overall cell capacity, removing the restrictions of the capacity regions indicated by FIGS. 2 and 3.

At least some embodiments provide for a novel high-performance low-complexity coordination scheme between BSs within a cluster of TDD BSs. Initially, each cluster of BSs elects a master BS, while the other BSs in the cluster act as slave(s). According to an example implementation, such master BS is manually, i.e., hard-coded pre-configured, to save up signaling overhead, since it should be independent from time and the RFC coordination technology.

Figure 4:
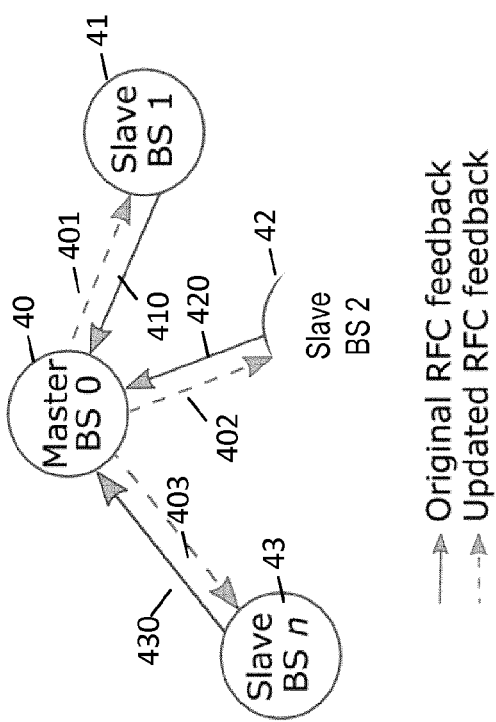
FIG. 4 shows a diagram illustrating RFC feedback between a master base station and slave base stations, for explaining an RFC based sliding codebook according to an example embodiment.

Referring to FIG. 4 illustrating RFC feedback between a master base station and slave base stations, a base station 40 of a cluster of base stations 40, 41, 42, 43 acts as master BS, and the base stations 41, 42, 43 act as slave BSs. A pre-defined RFC code-book (RFC-CB) is assumed known by all BSs 40-43. It is to be noted that in this application, a codebook term does not refer to the MIMO precoding codebook, but instead to a group of pre-designed RFCs. According to an example implementation, the RFC-CB includes any arbitrary number Q of unique RFC configurations, where they are packed in different sub-codebooks, each with the same DL-to-UL subframe ratio. Indeed, the RFCs within a sub-codebook are sliding versions of each other and thus, they correspond to the same traffic demand ratio within a frame; however, with a different DL and UL subframe placement. Then, the RFC based codebook (RFCbCB) according to at least some embodiments works as follows.

According to an example embodiment, in the first stage, each BS 40, 41, 42, 43 autonomously selects its own RFC from the entire RFC-CB based on its traffic demands, independently from the other BSs in the cluster, i.e., a fully dynamic TDD setup is performed.

Next, each BS 41, 42, 43 signals to the master BS 40 with just limited B=log$^2$ Q bits over e.g. an Xn interface to indicate its selected next RFC index from the RFC-CB, as illustrated by arrows 410, 420, 430. The master BS 40 collects all requested RFCs from all BSs 41, 42, 43 in the cluster. The master BS 40 afterwards seeks to minimize the average DL and UL subframe misalignment within the cluster, while simultaneously maximizing the aggregate capacity in both DL and UL directions.

According to an example embodiment, the master BS 40 identifies the RFC which is most requested by the majority of the BSs 40, 41, 42, 43 in the cluster. Accordingly, it considers such common RFC as the reference RFC to which all other RFCs requested by the remaining BSs should be updated to have as minimum subframe misalignment as possible. Thus, for each requested RFC, the master BS 40 loops over all unique RFCs within the same sub-codebook of the requested RFC and selects the one RFC that minimizes the average subframe misalignment with the common RFC. This way, the proposed coordination scheme offers additional degrees of freedom to minimize the potential CLI while still preserving the same requested DL to UL subframe ratio, and hence, same DL-to-UL traffic service ratio as being requested. According to an example embodiment, the master BS 40 signals all slave BSs 41, 42, 43 within the cluster with their individual updated RFCs, as shown in FIG. 4 by arrows 401, 402, 403.

Now reference is made to FIG. 5 illustrating a simplified block diagram of a control unit 50 that is suitable for use in practicing at least some example embodiments. A control unit such as the control 50 may be part of and/or used by the master BS 40. Further, a control unit such as the control 50 may be part of and/or used by each of the slave BSs 41, 42, 43.

The control unit 50 comprises processing resources (e.g. processing circuitry) 51, memory resources (e.g. memory circuitry) 52, and interfaces (e.g. interface circuitry) 53, coupled by a connection (e.g. a bus) 54.

According to an example implementation, the memory resources 52 store a program assumed to include program instructions that, when executed by the processing resources 51, enable the control unit 50 to operate in accordance with at least some example embodiments.

Inherent in the processing resources 51 is a clock to enable transmissions and receptions within appropriate time intervals and slots required, as the scheduling grants and the granted resources/subframes are time dependent. The interfaces 53 comprise a transceiver including both transmitter and receiver, and inherent in each is a modulator/demodulator commonly known as a modem. The processing resources 51 also are assumed to include a modem to facilitate communication over a (hardwire) link (e.g. Xn interface, F1 interface) between a master unit (e.g. master BS, CU) and slave units (e.g. BSs, DUs).

In general, example embodiments may be implemented by computer software stored in the memory resources 52 and executable by the processing resources 51, or by hardware, or by a combination of software and/or firmware and hardware.

The terms "connected," "coupled," or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein two elements may be considered to be "connected" or "coupled" together by the use of one or more wires, cables and printed electrical connections, as well as by the use of electromagnetic energy, such as electromagnetic energy having wavelengths in the radio frequency region, the microwave region and the optical (both visible and invisible) region, as non-limiting examples.

Further, as used in this application, the term "circuitry" refers to one or more or all of the following:
 (a) hardware-only circuit implementations (such as implementations in only analog and/or digital circuitry) and
 (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present.

Figure 6:
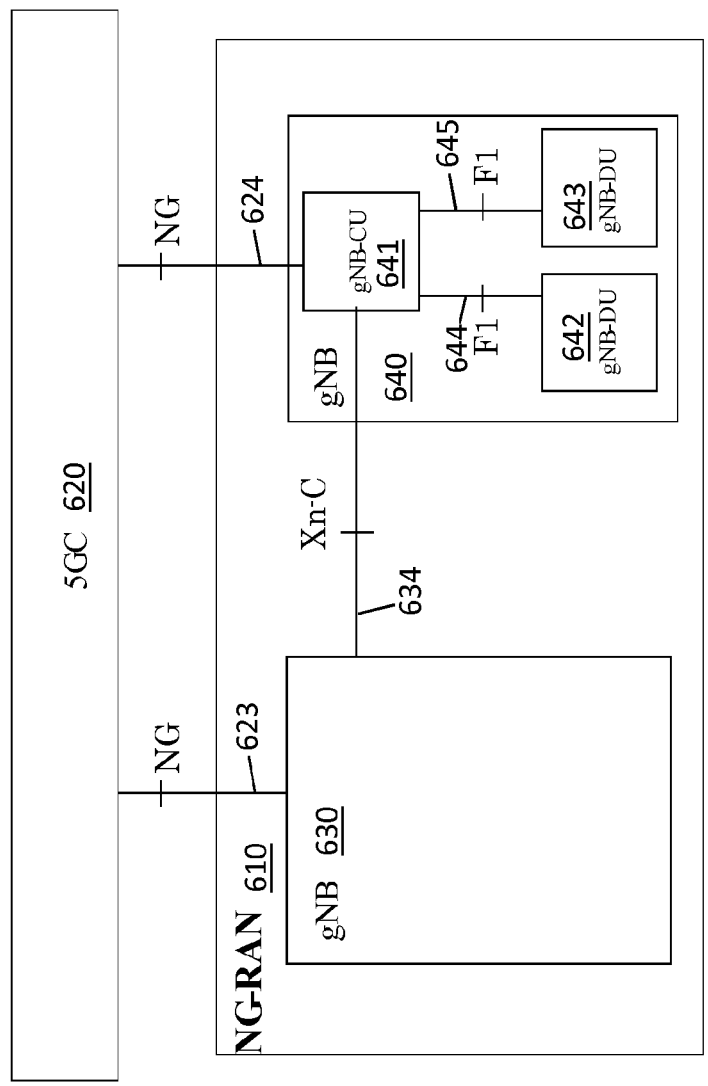
FIG. 6 shows a schematic block diagram illustrating an overview of a 5G NR architecture.

This definition of "circuitry" applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in server, a cellular network device, or other network device. FIG. 6 shows a schematic block diagram illustrating an overview of a 5G NR architecture, in which at least some embodiments are implementable. I The 5G NR architecture shown in FIG. 6 comprises an NG-RAN 610 and a 5GC 620. The NG-RAN comprises several gNBs, two of which are shown as gNB 630 and gNB 640 which are connected via an Xn-C interface 634 used for coordination using XnAP procedures. The gNB 630 and the gNB 640 are connected to the 5GC 620 via NG interfaces 623, 624.

The configuration of the gNB 640 is illustrated in more detail. The gNB 640 comprises a gNB-CU and several gNB-DUs 642, 643, connected via F1 interfaces 644, 645 via which signaling between master unit (e.g. master BS, gNB-CU) and slave units (e.g. slave BSs, gNB-DUs) is sent.

The 5G NR architecture allows C-RAN implementations with one or multiple centralized units (CU) 641, each serving a large number of distributed units (DU) 642, 643. Such CU-DU options are made possible by the introduction of two interfaces named E1 (not shown) between control and user plane in the CU 641 and F1 between the CU 641 and the DUs 642, 643.

When using the CU/DU split architecture, the CU 641 takes the role as the master, while the DUs 642, 643 act as slaves. Signaling of which RFC to use at the DUs 642, 643 is conveyed via F1 control plane signaling path (F1-C) of each F1 interface 644, 645.

Figure 7:
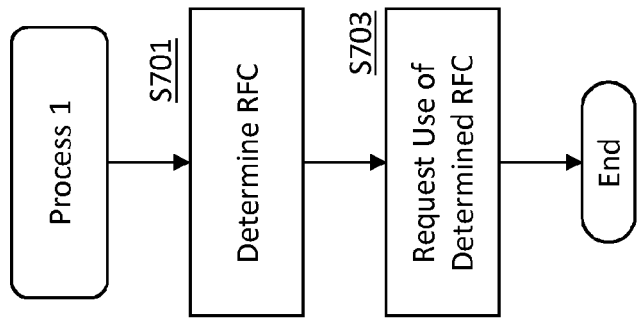
FIG. 7 shows a flowchart illustrating a process of a coordination scheme according to an example embodiment.

FIG. 7 shows a flowchart illustrating a process 1 of a coordination scheme according to an example embodiment. Process 1 may be executed by a slave unit (e.g. slave BS, DU) of a mobile communication system, e.g. using a control unit such as control unit 50.

In step S701, out of a predefined sliding codebook of Q unique radio frame configurations, a radio frame configuration for communicating with user equipments is determined.

According to the example embodiment, each of the Q unique radio frame configurations comprises subframes for downlink communication with the user equipments and subframes for uplink communication with the user equipments. The predefined sliding codebook comprises sub-codebooks each grouping together radio frame configurations of the Q unique radio frame configurations, that share the same downlink-to-uplink subframe ratio but with a phase offset of the radio frame configurations.

In step S703, a request to use the determined radio frame configuration is transmitted to a master unit (e.g. master BS, CU) of a cluster which the slave unit belongs to, wherein the request indicates the determined radio frame configuration.

According to the example embodiment, the slave unit may receive, from the master unit of the cluster, a response indicating, out of the predefined sliding codebook, an updated radio frame configuration to be used by the slave unit for communicating with the user equipments instead of the determined radio frame configuration.

Figure 8:
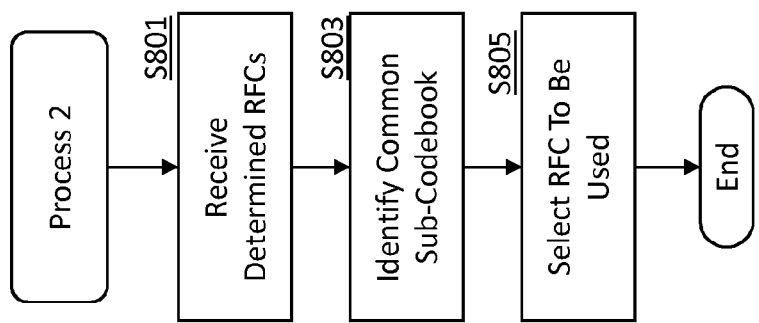
FIG. 8 shows a flowchart illustrating a process of a coordination scheme according to an example embodiment.

FIG. 8 shows a flowchart illustrating a process 2 of a coordination scheme according to an example embodiment. Process 2 may be executed by a master unit (e.g. master BS, CU) of a mobile communication system, e.g. using a control unit such as control unit 50.

In step S801, a request to use a radio frame configuration determined by a slave unit for communicating with user equipments is received from each slave unit of a plurality of slave units of the mobile communication system, which belong to a cluster of the master unit.

According to the example embodiment, the determined radio frame configuration is indicated in the request and is one of Q unique radio frame configurations included in a predefined sliding codebook. Each of the Q unique radio frame configurations comprises subframes for downlink communication with the user equipments and subframes for uplink communication with the user equipments. The predefined sliding codebook comprises sub-codebooks each grouping together radio frame configurations of the Q unique radio frame configurations, that share the same downlink-to-uplink subframe ratio but with a phase offset of the radio frame configurations.

In step S803, a common sub-codebook is identified out of the sub-codebooks, that comprises most of the determined radio frame configurations indicated in the requests received from the plurality of slave units. According to an example implementation, a common radio frame configuration included in the common sub-codebook is identified, that corresponds (e.g. is equal or similar) to most of the determined radio frame configurations indicated in the requests received from the plurality of slave units.

In step S805, for each of the determined radio frame configurations indicated in the requests received from the plurality of slave units, a radio frame configuration is selected out of the Q unique radio frame configurations, that corresponds to a sub-codebook of the determined radio frame configuration and minimizes an average misalignment with a radio frame configuration (e.g. the common radio frame configuration) of the common sub-codebook.

For example, a radio frame configuration "corresponding to the sub-codebook of the determined radio frame configuration" is at least one of a radio frame configuration of the sub-codebook of the determined radio frame configuration, and a radio frame configuration of a sub-codebook near the sub-codebook of the determined radio frame configuration. "Near sub-codebooks" are sub-codebooks with near (e.g. similar) DL-to-UL subframe ratios.

Further, an average misalignment between radio frame configurations is calculated by counting the CLI occurrences as illustrated e.g. in FIG. 1 and dividing the obtained count value by the number of subframes. It is to be noted that the example embodiment is not limited to calculating the average misalignment, and it is possible to generically calculate the misalignment as an actual number of misaligned subframes.

According to the example embodiment, based on the selected radio fame configuration, a response is transmitted to the request indicating the determined radio frame configuration, wherein the response indicates an updated radio frame configuration to be used for communicating with the user equipments instead of the determined radio frame configuration. According to an example implementation, in case the selected radio frame configuration is equal to the determined radio frame configuration, the master unit does not transmit a response to the request. Thus, if slave BSs do not get a response from the master BS, this means they should use the determined radio frame configuration. Otherwise, in case the selected radio frame configuration is not equal to the determined radio frame configuration, the master unit transmit a response to the request indicating the selected radio frame configuration as the updated radio frame configuration.

Figure 9A:
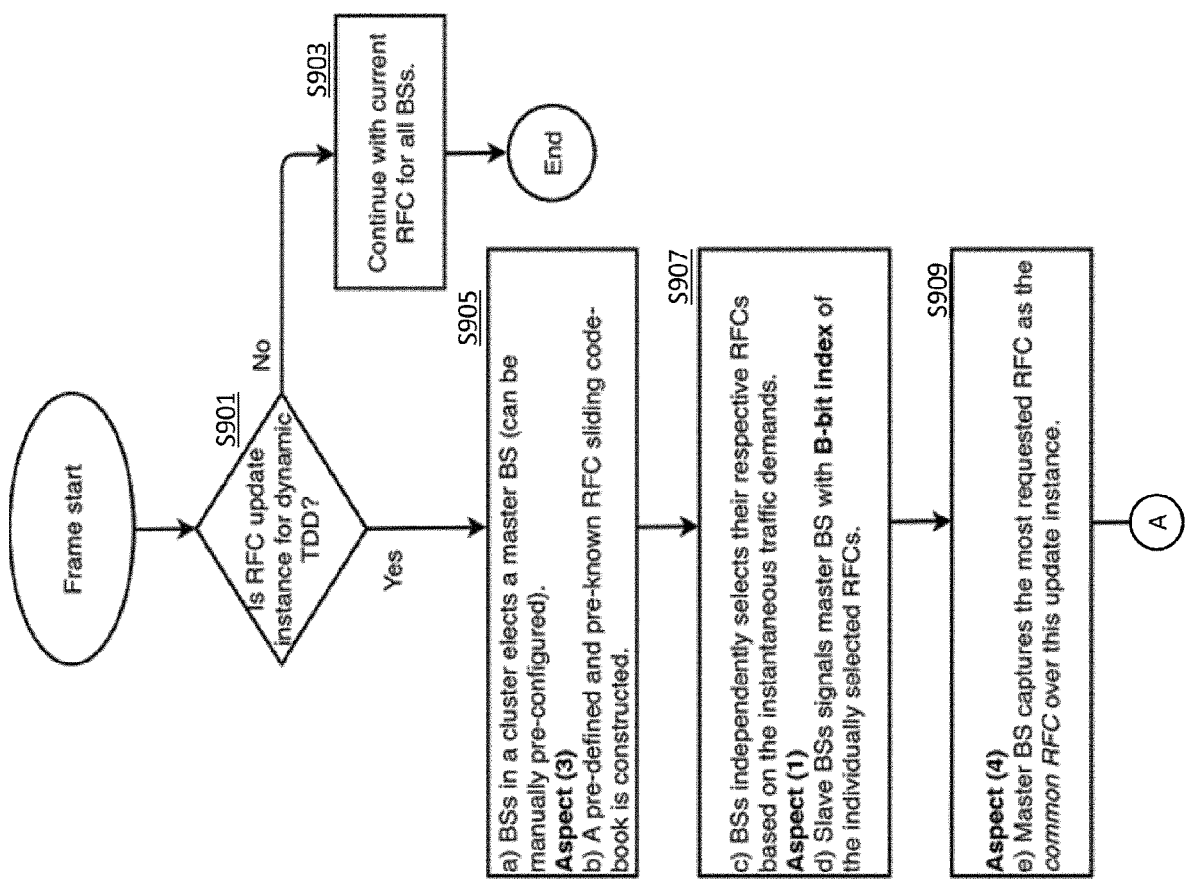

Now reference is made to FIGS. 9A and 9B, which show a flowchart illustrating a process of a coordination scheme according to an example embodiment. The process is implemented by a mobile communication system, e.g. a radio access network according to 5G NR.

After process start (e.g. frame start), in step S901, it is checked whether an RFC is an update instance for dynamic TDD. In case the RFC is not an update instance (NO in S901), the process proceeds to step S903 in which BSs of the mobile communication system continue operation with their current RFC.

In case the RFC is an update instance (YES in S901), the process proceeds to step S905 in which BSs in a cluster elect a master BS. According to an implementation example, the master BS is manually pre-configured. Further, a pre-defined and pre-known RFC sliding codebook is constructed. Then, the process proceeds to step S907.

In step S907, the BSs independently select their respective RFCs e.g. based on instantaneous traffic demands. The slave BSs signal a B-bit index of the individually selected RFCs to the master BS. Then, the process proceeds to step S909.

In step S909, the master BS captures the most requested RFC as the common RFC over this update instance. Then, the process proceeds to step S911.

In step S911, for each requested RFC (also referred to as "determined radio frame configuration"), it is checked whether a misalignment to the common RFC exceeds a threshold (first threshold). In case the misalignment does not exceed the threshold (first threshold) (NO in S911), the process proceeds to step S913 in which this requested RFC is skipped and no update is performed on the requested RFC. Then the process proceeds to step S923.

In case the misalignment exceeds the threshold (first threshold) (YES in S911), the process proceeds to step S915 in which the master BS loops over all RFCs within the same sub-codebook of this requested RFC and considers the one RFC with minimum misalignment to the common RFC. Then, the process proceeds to step S917.

In step S917, it is checked whether the misalignment to the common RFC exceeds a threshold (e.g. the first threshold). In case the misalignment does not exceed the threshold, the process proceeds to step S919 in which the requested RFC is updated with the selected RFC from the same sub-codebook. Then the process proceeds to step S923.

In case the misalignment exceeds the threshold, the process proceeds to step S921 in which the master BS slides to DL-to-UL nearest sub-codebook and loops over all respective RFCs. The master BS considers the RFC with the minimum misalignment to the common RFC which is below a threshold (e.g. second threshold that may be different from the first threshold). If the threshold (e.g. second threshold) is not satisfied, the master BS considers the one RFC either from same or different sub-codebook as the requested RFC, and with the minimum possible misalignment to the common RFC. The requested RFC is updated with the RFC with the minimum misalignment below the threshold (e.g. second threshold) or the RFC with the minimum possible misalignment. Then the process proceeds to step S923.

In step S923, it is checked whether there are RFCs from other BSs to be updated. In case there are RFCs to be updated (YES in step S923), the process returns to step S911. In case there are no RFCs to be updated (NO in step S923), the process proceeds to step S925 in which the master BS signals all slave BSs with B-bit indices of their updated RFCs. Then the process ends.

According to an example implementation, in case an RFC requested by a slave BS is not updated, in S925 the master BS does not signal an index to the slave BS. The slave BS not receiving an index of an updated RFC from the master BS, uses the requested RFC.

As illustrated in FIGS. 9A and 9B, in step S907 an aspect (1) is executed. Aspect (1) comprises signaling from the slave BSs to the master BS within a cluster, of B-bit index over at least one of Xn interface and F1 interface to feedback the master BS with the requested RFCs from the RFC codebook that they wish to use during the next time duration until they have further need to change their RFCs, if the traffic load changes. This time duration can be flexibly either per TTI or many multiples of the radio frame, i.e., t*10 ms, to trade off the signaling overhead with RFC flexibility.

In step S925, an aspect (2) is executed. Aspect (2) comprises signaling back from the master BS to the slave BSs within a cluster, of B-bit index over at least one of Xn interface and F1 interface to feedback slave BSs with the updated RFCs from the RFC codebook that must be used in the next time duration. Sometimes, updated RFCs are equal to requested RFCs, if they originally introduce limited CLI.

In step S905, an aspect (3) is executed. Aspect (3) comprises the design of the RFC sliding codebook, where each set of RFCs is grouped to have the same DL-to-UL subframe ratio; however, with a phase offset of the RFC.

In steps S909, S915 and S921, an aspect (4) is executed. Aspect (4) comprises the behavior of the master BS to update the RFCs of the slave BSs by satisfying two objective functions: (a) minimizing the average misalignment and hence the potential CLI, and (b) maximizing the aggregate capacity in uplink and downlink directions simultaneously.

In the following, example implementations of aspects (1) to (4) will be described.

Figure 10:
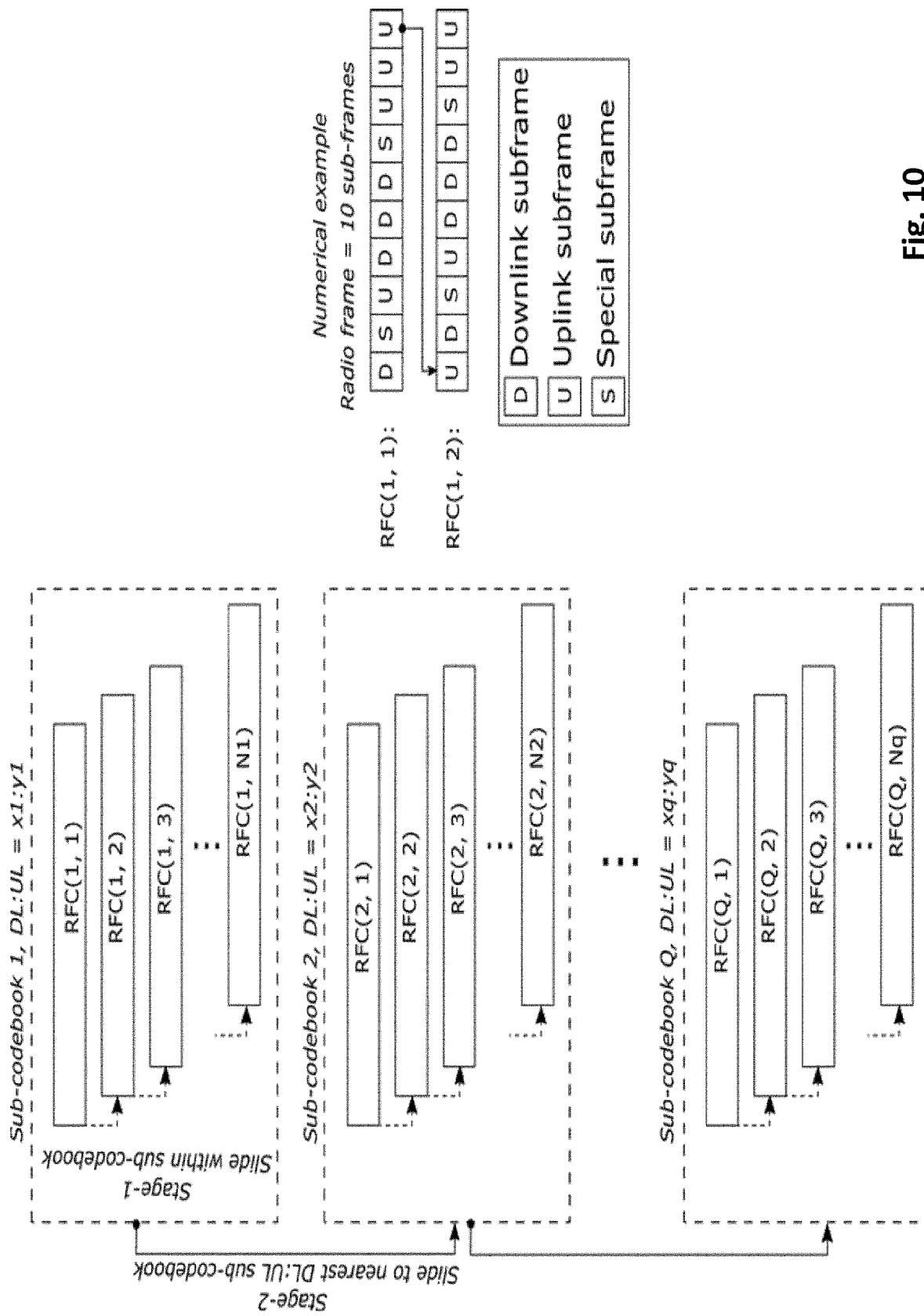
FIG. 10 shows a diagram illustrating an RFC sliding codebook structure according to an example implementation.

According to an example implementation of aspect (3), a predefined sliding codebook of Q unique RFCs is constructed, where each group of RFCs, which share the same DL:UL subframe ratio, is packed together in a separate sub-codebook. Basically, the RFCs in the same sub-codebook are sliding versions of each other, as depicted in FIG. 10. There are several options how such predefined codebook can be constructed. Examples include a direct inclusion in NR specifications or being given as an input parameter from an operator/vendor and being signaled to BSs through an operations administration and maintenance (OAM) entity of the communication system.

All BSs within a cluster statistically elect a master BS. Such master BS can be pre-configured from planning phase since it does not matter which BS in the cluster is the master and it does not change with time. The master/slave BS roles can be also specified by the OAM entity.

The time to update the RFC can be flexibly set, e.g. either per TTI or multiples of the radio frame. When the time to update the RFC elapses, each BS independently determines its desired RFC from the RFC-CB e.g. based on at least one of its instantaneous traffic demands and any arbitrary link direction selection algorithm.

According to an example implementation of aspect (1), each slave BS signals the master BS within the cluster by a B=log$_2$ Q bits index over at least one of the Xn interface and the F1 interface to indicate which RFC is desired for the next frame.

According to an example implementation of aspect (4), the master BS identifies the common RFC sub-codebook of its cluster, as being the sub-codebook, which includes the most requested RFCs by the majority of the BSs in the cluster. Thus, it considers such sub-codebook, and its associated DL:UL subframe placement as the reference to which other requested RFCs from other sub-codebooks have to be updated to satisfy the minimum misalignment with.

For each requested RFC, the master BS checks if the subframe misalignment to the common RFC is below a threshold, if satisfied, then, the master BS does not update such RFC, since it originally results in an accepted CLI. Otherwise, the master BS slides to the other RFCs in the same sub-codebook of this requested RFC (as e.g. illustrated by "stage-1" in FIG. 10 when it is assumed that sub-codebook 1 is the sub-codebook of the requested RFC) and selects the one RFC with the minimum misalignment to the common RFC. If the minimum misalignment is below a predefined threshold, the master BS selects a new RFC for the respective BS. Therefore, the subframe misalignment, and hence, the CLI level over the next frame are limited while still applying the same DL:UL service ratio to the traffic demand of this BS.

Otherwise, if the predefined threshold is not satisfied, the master BS slides to another sub-codebook which has the nearest DL:UL subframe ratio to the requested one (as e.g. illustrated by "stage-2" in FIG. 10 when it is assumed that sub-codebook 1 is the sub-codebook of the requested RFC), hence, minimizing the capacity loss due to the DL:UL ratio change. The master BS repeats the same operation across all RFCs in this new sub-codebook (sub-codebook 2 in the example of FIG. 10). If an average subframe misalignment that is below a predefined threshold could not be obtained at the end, the master BS may either slide to another sub-codebook, scarifying more TDD flexibility for the sake of limited CLI or as last resort, it selects the RFC with the minimum possible misalignment to the common RFC either from a same or different sub-codebook to the requested RFC, even if it does not satisfy the predefined threshold.

After updating all RFCs from all slave BSs in the cluster, the master BS signals the slave BSs with a B=log$_2$ Q bits index over at least one of the Xn interface and the F1 interface to indicate the updated individual RFCs.

In the following, simulation results of the proposed coordination scheme are presented. The major simulation parameters are listed in Table 1 shown in FIG. 11.

Within each cell, there is K=10 average number of active users (e.g. user equipments). The traffic is characterized by the FTP3 traffic model, a finite Z-bit packet size per user and with a Poisson point arrival process λ. Hence, the aggregate offered DL and UL loads per cell in bits/sec can be given as: K×λ_({DL,UL})×Z. The system bandwidth is 10 MHz with 8 antennas at the BS and 2 antennas at the user. The proposed coordination scheme is tested over extreme offered traffic loads of DL-heavy traffic ratio (which corresponds to strong DL-to-UL CLI), UL-heavy traffic ratio (which corresponds to strong UL-to-DL CLI), and DL-UL neutral traffic ratio (which corresponds to a fair CLI). Furthermore, performance of the proposed algorithm is evaluated under both the transmission control protocol (TCP) and user datagram protocol (UDP).

The performance indicators of the proposed RFCbCB coordination scheme are compared against several state-of-art solutions and standardized proposals. Here is a brief description of those proposals:

1. Fully dynamic and non-coordinated TDD (FDNC): BSs independently select their respective RFCs based on their current traffic demands, i.e., the instantaneous ratio of the DL:UL traffic buffers. No coordination between BSs is assumed. Hence, maximum RFC flexibility to traffic demand per cell is achieved; however, with a higher probability of strong CLI levels due to the misaligned UL and DL transmissions.

2. Perfect DL-to-UL CLI cancellation (PDUCC): in [1], a perfect DL-to-UL CLI cancelation is assumed using packet exchange. The DL heavy BSs signal the adjacent UL-heavy BSs with the DL payload, PRB mapping, MCS information, precoding information, etc. Thus, the victim UL-heavy BSs can then perfectly cancel the strong CLI from the adjacent DL transmissions, leading to an ideal UL capacity without CLI; however, with a significant signaling overhead over the Xn interface.

Table 2 illustrated in FIG. 12 shows the achievable UL and DL capacity of the proposed RFCbCB in case the master BS can only slide to RFCs in the same requested sub-codebook, FDNC and UL-ideal PDUCC. As can be noticed, the proposed RFCbCB clearly achieves a significant capacity improvement regardless of the offered traffic ratio with significantly improved cell capacity than the FDNC, approaching the ideal PDUCC; however, with just 6-bit exchange over the Xn interface. For instance, a gain of ~+154.701% in the UL capacity is achieved over the FDNC for DL:UL=2:1 traffic ratio case, where there is severe DL-to-UL CLI. However, for an UL heavy scenario, i.e., DL:UL=1:2, the maximum achievable gain in the UL capacity is ~+60%. This is due to the fact that, in this scenario, the BSs are overwhelmed by UL transmissions which impose CLI to the respective DL transmissions. However, the UL-to-DL CLI is much less severe than the DL-to-UL interference, since the desired DL power is much larger than the interfering UL power. Hence, FDNC originally performs quite well without coordination.

Figure 13:
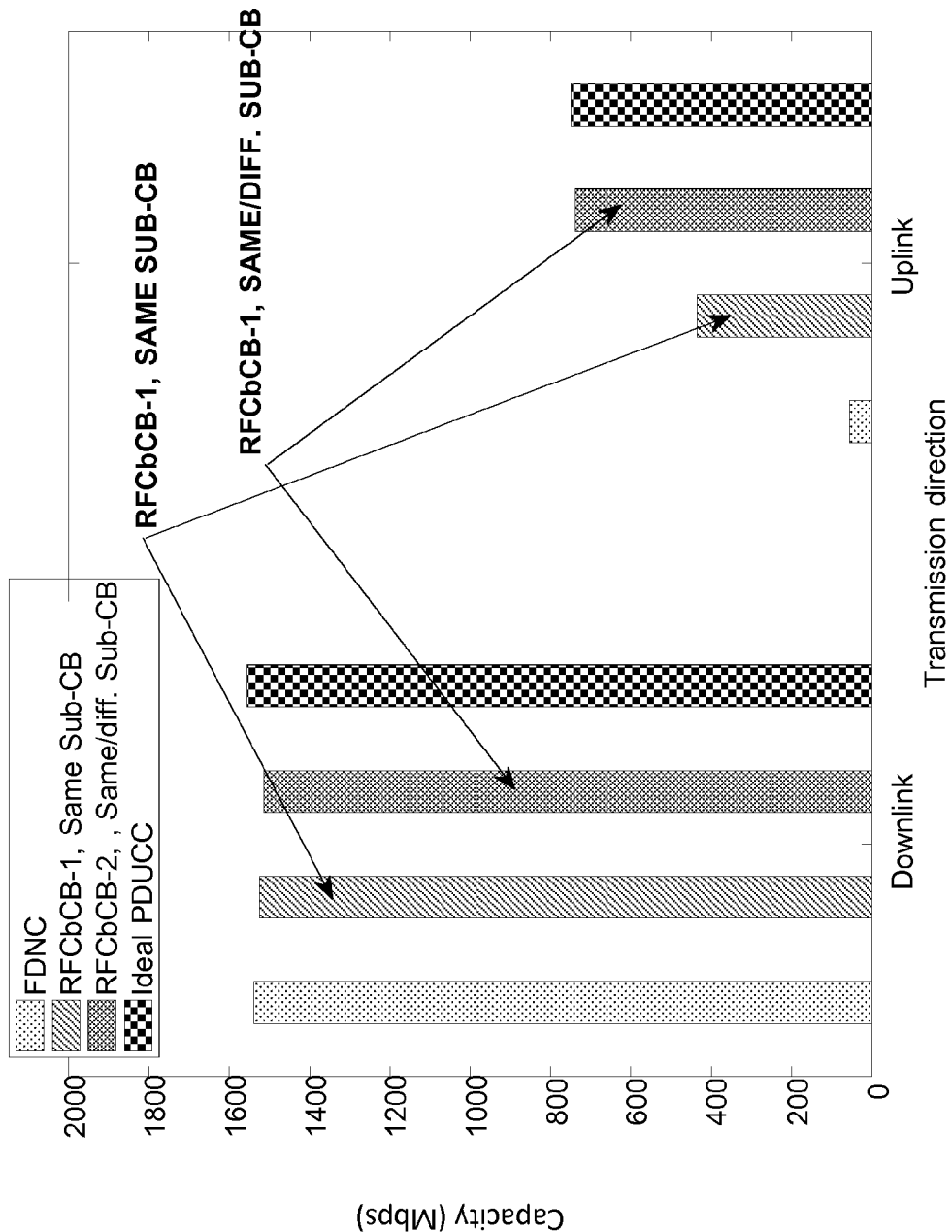
FIG. 13 shows a diagram illustrating UL and DL capacity performance with UDP (Mbps), DL:UL=2:1.
Figure 14:
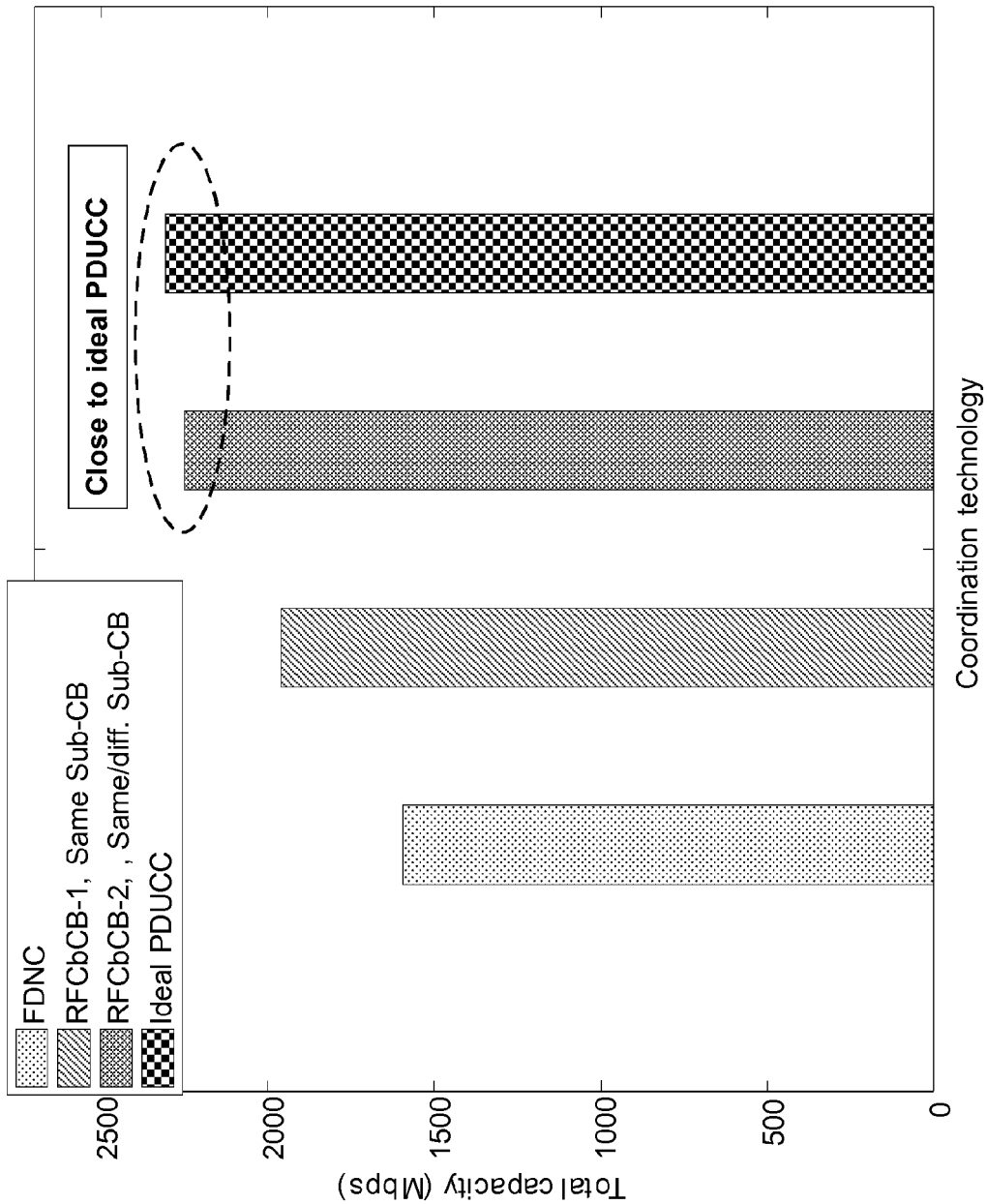
FIG. 14 shows a diagram illustrating total capacity performance with UDP (Mbps), DL:UL=2:1.

FIGS. 13 and 14 show the ECDF of the UL, DL and total cell capacity, with DL:UL traffic ratio=2:1, respectively. Herein, for the proposed RFCbCB, the master BS can slide to RFCs from different nearest sub-codebooks to the requested one, if a low average misalignment, i.e., lower than a defined threshold, cannot be achieved. As shown, the UL and DL capacity of the proposed coordination scheme is even further improved, i.e., a gain of ~+171.931% in the UL capacity is achieved compared to FDNC for DL:UL=2:1 traffic ratio case, leading to significantly improved total capacity, very close to the ideal PDUCC, as shown in FIG. 13. The reason is that the proposed RFCbCB sacrifices a bit of the instantaneous TDD RFC flexibility. That is, the master BS transits to a different nearest DL:UL subframe ratio than the one requested (e.g. determined) by a slave BS, for the sake of minimizing the average CLI. This results in a better and faster decoding ability, especially in the UL direction, since very much less DL-to-UL CLI is experienced, and consequently, the UL traffic gets transmitted faster leaving more time and resources for DL traffic. Thus, significant long-term improvements in both directions are obtained. Table 3 depicted in FIG. 15 shows the number of the DL-to-UL CLI instances, normalized to the FDNC case, across very long simulations, where it can be clearly concluded that such CLI is greatly minimized with the proposed coordination scheme. Such number of DL-to-UL CLI instances is calculated for each BS, for each allocated PRB, such that it is incremented by one if there is CLI on this PRB, coming from the other active BSs, and zero otherwise.

Finally, similar conclusions are obtained when TCP is used on top. The rational from testing the proposed RFCbCB under TCP is its corresponding complex flow and congestion controls. For example, in the DL direction, these processes are fully dependent on how well UL TCP ACKs are received, for which the DL-to-UL CLI can be destructive. If such UL TCP ACKs are lost or could not be decoded, the TCP flow and congestion control processes intentionally reduce the achievable rate, which leads to a poor overall capacity.

Figure 16:
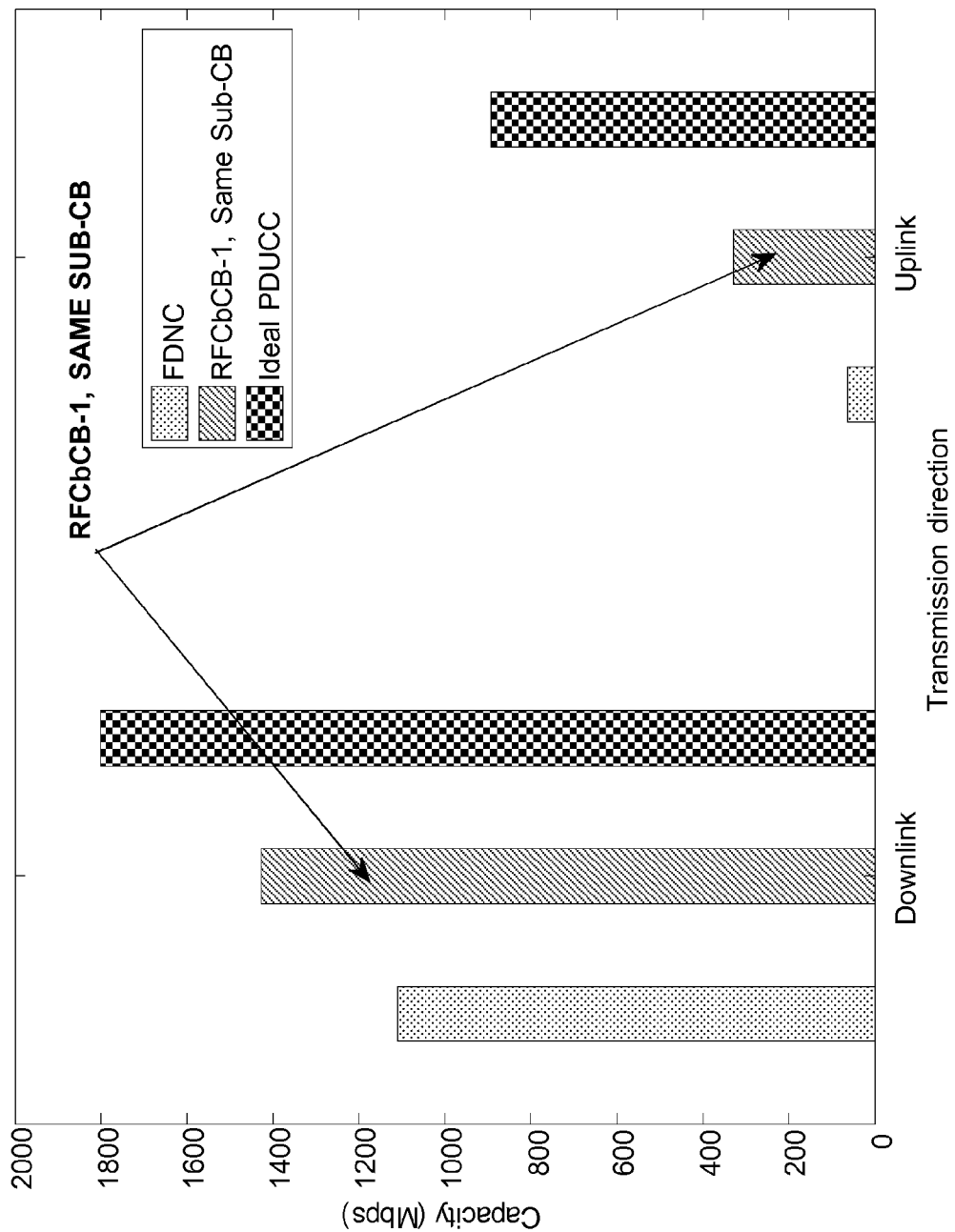
FIG. 16 shows a diagram illustrating UL and DL capacity performance with TCP (Mbps), DL:UL=2:1.
Figure 17:
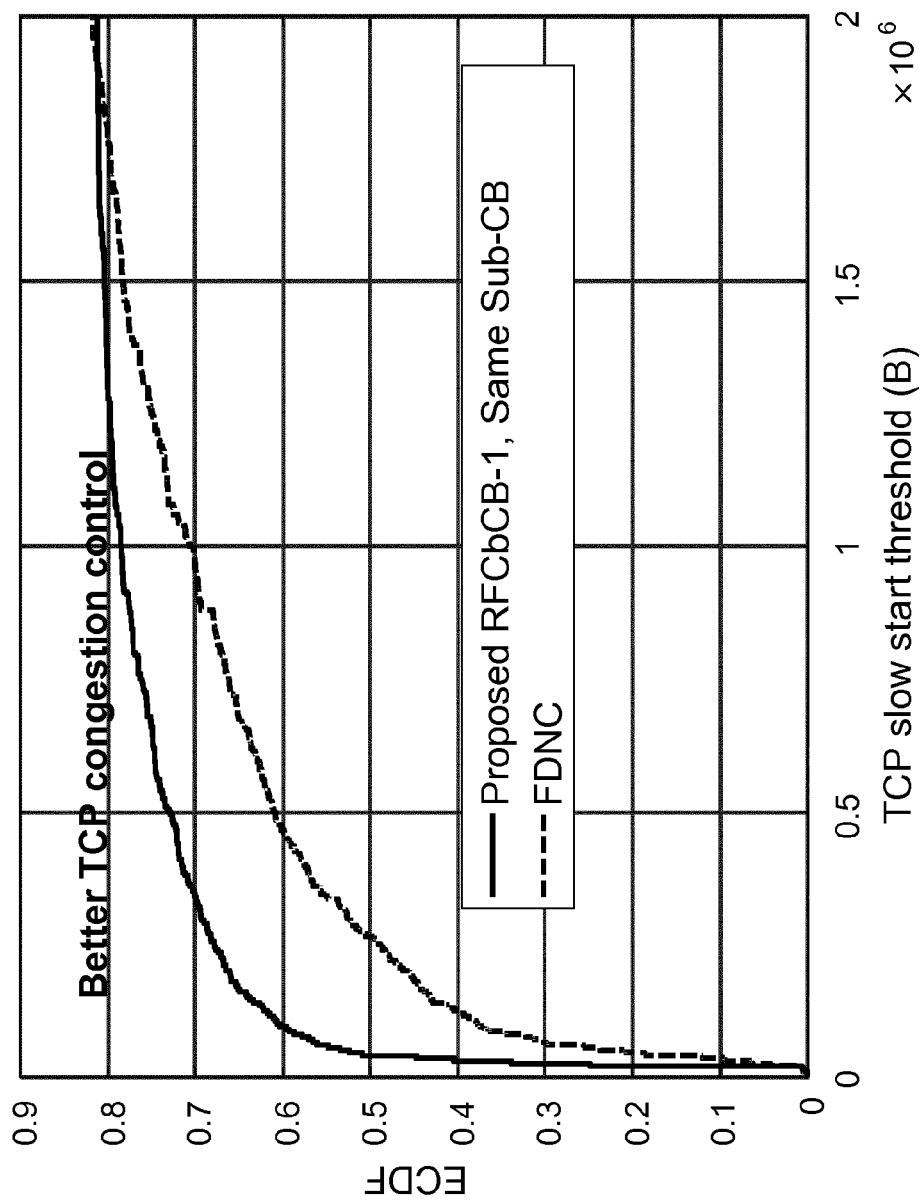
FIG. 17 shows a diagram illustrating TCP slow start performance.

Thus, FIG. 16 presents the UL and DL capacity performance under TCP, where a similar gain of ~+136.125% in the UL capacity compared to FDNC is achieved for DL:UL=2:1 traffic ratio case. This is due to the improved TCP slow start performance with the proposed RFCbCB, as shown in FIG. 17.

Based on the simulation results, at least some embodiments of the proposed coordination scheme provides robust and reliable capacity performance in both UL and DL directions, regardless of the offered traffic loads in both directions, hence, regardless of the potential CLI levels.

At least some embodiments of the proposed coordination scheme offer a sufficient and dynamic tradeoff between the TDD RFC flexibility and CLI pre-mitigation capability, i.e., it only sacrifices part of the TDD RFC degrees of freedom when potentially high CLI levels are expected. As shown by the simulation results, this capacity loss is fully recovered and inverted to a significant gain on the long-term due to the greatly reduced CLI.

Compared to the state of art proposals and contributions, at least some embodiments of the proposed coordination scheme require very low coordination complexity, with very limited signaling overhead of just B-bit index over the Xn/F1 interface. Neither user CLI measurements nor scheduling decision sharing among BSs are required.

According to an aspect, an apparatus of a mobile communication system is provided. According to an example implementation, the apparatus comprises a control unit such as control unit 50 illustrated in FIG. 5. According to an example implementation, the apparatus executes process 1 of FIG. 7, e.g. using control unit 50.

The apparatus comprises means for determining, out of a predefined sliding codebook of Q unique radio frame configurations, a radio frame configuration for communicating with user equipments, wherein each of the Q unique radio frame configurations comprises subframes for downlink communication with the user equipments and subframes for uplink communication with the user equipments, and wherein the predefined sliding codebook comprises sub-codebooks each grouping together radio frame configurations of the Q unique radio frame configurations, that share the same downlink-to-uplink subframe ratio but with a phase offset of the radio frame configurations, and means for transmitting, to a master unit of a cluster which the apparatus belongs to, a request to use the determined radio frame configuration, wherein the request indicates the determined radio frame configuration.

According to an example embodiment, the apparatus comprises means for receiving, from the master unit of the cluster, a response indicating, out of the predefined sliding codebook, an updated radio frame configuration to be used by the apparatus for communicating with the user equipments instead of the determined radio frame configuration.

According to an example embodiment, the means for determining determines the radio frame configuration based on at least one of instantaneous traffic demands of the apparatus and a link direction selection algorithm.

According to an example embodiment, the determined radio frame configuration is requested to be used during the next time period until re-performing the determining, and the updated radio frame configuration is to be used during the next time period until re-performing the determining.

According to an example embodiment, the determined radio frame configuration is indicated by an index of $B=\log_2 Q$ bits.

According to an example embodiment, the updated radio frame configuration is indicated by an index of $B=\log_2 Q$ bits.

According to an example embodiment, the time period comprises at least one of a transmission time interval and multiples of a radio frame duration.

According to an example embodiment, the determining is re-performed due to changed traffic load at the apparatus.

According to an example embodiment, the means for transmitting transmits the request via at least one of an Xn interface and an F1 interface.

According to an example embodiment, the means for receiving receives the response via at least one of an Xn interface and an F1 interface.

According to an example embodiment, the apparatus is at least one of a base station and a distributed unit according to a fifth generation new radio communication system.

According to another aspect, an apparatus of a mobile communication system is provided. According to an example implementation, the apparatus comprises a control unit such as control unit 50 illustrated in FIG. 5. According to an example implementation, the apparatus executes process 2 of FIG. 7, e.g. using control unit 50.

The apparatus comprises means for receiving, from each slave unit of a plurality of slave units of the mobile communication system, which belong to a cluster of the apparatus, a request to use a radio frame configuration determined by the slave unit for communicating with user equipments, wherein the determined radio frame configuration is indicated in the request and is one of Q unique radio frame configurations included in a predefined sliding codebook, wherein each of the Q unique radio frame configurations comprises subframes for downlink communication with the user equipments and subframes for uplink communication with the user equipments, and wherein the predefined sliding codebook comprises sub-codebooks each grouping together radio frame configurations of the Q unique radio frame configurations, that share the same downlink-to-uplink subframe ratio but with a phase offset of the radio frame configurations, means for identifying a common sub-codebook out of the sub-codebooks, that comprises most of the determined radio frame configurations indicated in the requests received from the plurality of slave units, and means for, for each of the determined radio frame configurations indicated in the requests received from the plurality of slave units, selecting a radio frame configuration out of the Q unique radio frame configurations, that corresponds to a sub-codebook of the determined radio frame configuration and minimizes an average misalignment with a radio frame configuration of the common sub-codebook.

According to an example embodiment, the apparatus further comprises means for, based on the selected radio fame configuration, transmitting a response to the request indicating the determined radio frame configuration, wherein the response indicates an updated radio frame configuration to be used for communicating with the user equipments instead of the determined radio frame configuration.

According to an example embodiment, the means for identifying further identifies a common radio frame configuration included in the common sub-codebook, that corresponds to most of the determined radio frame configurations indicated in the requests received from the plurality of slave units, wherein the radio frame configuration of the common sub-codebook is the common radio frame configuration.

According to an example embodiment, the means for selecting comprises means for calculating an average misalignment between the determined radio frame configuration and the radio frame configuration of the common sub-codebook, and the apparatus further comprises means for, in case the average misalignment between the determined radio frame configuration and the radio frame configuration of the common sub-codebook does not exceed a first predetermined threshold, not transmitting a response to the request indicating the determined radio frame configuration.

According to an example embodiment, the means for selecting further selects, in case the average misalignment between the determined radio frame configuration and the radio frame configuration of the common sub-codebook exceeds the first predetermined threshold, a radio frame configuration of the sub-codebook of the determined radio frame configuration, that minimizes an average misalignment with the radio frame configuration of the common codebook, and comprises means for, in case an average misalignment between the selected radio frame configuration of the sub-codebook of the determined radio frame configuration and the radio frame configuration of the common codebook does not exceed the first predetermined threshold, updating the determined radio frame configuration with the selected radio frame configuration of the sub-codebook of the determined radio frame configuration, wherein the apparatus further comprises means for transmitting a response to the request indicating the determined radio frame configuration, the response indicating, as updated radio frame configuration, the selected radio frame configuration of the sub-codebook of the determined radio frame configuration.

According to an example embodiment, the means for selecting further selects, in case the minimized average misalignment between the selected radio frame configuration of the sub-codebook of the determined radio frame configuration and the radio frame configuration of the common codebook exceeds the first predetermined threshold, a radio frame configuration of a sub-codebook near the sub-codebook of the determined radio frame configuration with respect to the downlink-to-uplink subframe ratio, that minimizes an average misalignment with the radio frame configuration of the common codebook, and, in case an average misalignment between the selected radio frame configuration of the near sub-codebook and the radio frame configuration of the common codebook does not exceed a second predetermined threshold, the means for updating updates the determined radio frame configuration with the selected radio frame configuration of the near sub-codebook, and the means for transmitting transmits a response to the request indicating the determined radio frame configuration, the response indicating, as updated radio frame configuration, the selected radio frame configuration of the near sub-codebook.

According to an example embodiment, in case the average misalignment between the selected radio frame configuration of the near sub-codebook and the radio frame configuration of the common codebook exceeds the second predetermined threshold, the means for updating updates the determined radio frame configuration either with the selected radio frame configuration of the sub-codebook of the determined radio frame configuration or with the selected radio frame configuration of the near sub-codebook, that minimizes an average misalignment with the radio frame configuration of the common codebook, and the means for transmitting transmits a response to the request indicating the determined radio frame configuration, the response indicating, as updated radio frame configuration, either the selected radio frame configuration of the sub-codebook of the determined radio frame configuration or the selected radio frame configuration of the near sub-codebook, that minimizes an average misalignment with the radio frame configuration of the common codebook.

According to an example embodiment, the near sub-codebook comprises a sub-codebook nearest to the sub-codebook of the determined radio frame configuration with respect to the downlink-to-uplink subframe ratio.

According to an example embodiment, the first threshold and the second threshold are different from each other.

According to an example embodiment, the updated radio frame configuration is to be used during the next time period until re-performing the determining.

According to an example embodiment, the updated radio frame configuration is indicated by an index of $B=\log_2 Q$ bits.

According to an example embodiment, the time period comprises at least one of a transmission time interval and multiples of a radio frame duration.

According to an example embodiment, the means for transmitting transmits the response via at least one of an Xn interface and an F1 interface.

According to an example embodiment, the means for receiving receives the request via at least one of an Xn interface and an F1 interface.

According to an example embodiment, the apparatus is at least one of a base station and a central unit according to a fifth generation new radio communication system.

According to a further aspect, slave units of a mobile communication system each determine, out of a predefined sliding codebook of Q unique radio frame configurations, a radio frame configuration for communicating with user equipments, and transmit, to a master unit of a cluster which the slave units belong to, a request to use the determined radio frame configuration. The predefined sliding codebook comprises sub-codebooks each grouping together radio frame configurations of the Q unique radio frame configurations, that share the same downlink-to-uplink subframe ratio but with a phase offset of the radio frame configurations. The master unit identifies a common sub-codebook out of the sub-codebooks of the predefined sliding codebook, that comprises most of the determined radio frame configurations indicated in the requests received from the slave units, and, for each of the determined radio frame configurations, selects a radio frame configuration out of the Q unique radio frame configurations, that corresponds to a sub-codebook of the determined radio frame configuration and minimizes an average misalignment with a radio frame configuration of the common sub-codebook.

It is to be understood that the above description is illustrative and is not to be construed as limiting. Various modifications and applications may occur to those skilled in the art without departing from the true spirit and scope as defined by the appended claims.

The invention claimed is:

1. A master base station of a mobile communication system, the master base station comprising at least one processor and at least one memory including computer program code, the at least one memory and the computer program code configured to, with the at least one processor, cause the master base station at least to:
   receive, from each slave base station of a plurality of slave base stations of the mobile communication system, which belong to a cluster of the master base station, a request to use a radio frame configuration determined by the slave base stations for communicating with user equipments,
   wherein the determined radio frame configuration is indicated in the request and is one of Q unique radio frame configurations included in a predefined sliding codebook, where Q has a value greater than 1,
   wherein each of the Q unique radio frame configurations comprises subframes for downlink communication with the user equipments and subframes for uplink communication with the user equipments, and
   wherein the predefined sliding codebook comprises sub-codebooks each grouping together radio frame configurations of the Q unique radio frame configurations, that share the same downlink-to-uplink subframe ratio but with a phase offset of the radio frame configurations;
   identify a common sub-codebook out of the sub-codebooks, that comprises most of the determined radio frame configurations indicated in the requests received from the plurality of slave base stations; and
   for each of the determined radio frame configurations indicated in the requests received from the plurality of slave base stations,
   select, as a response to the request from each slave base station of the plurality of slave base stations, a radio frame configuration out of the Q unique radio frame configurations, that corresponds to a sub-codebook of the determined radio frame configuration and minimizes an average misalignment with a radio frame configuration of the common sub-codebook.

2. The master base station of claim 1, wherein the at least one memory and the computer program code are configured to, with the at least one processor, cause the master base station to further:
   based on the selected radio fame configuration, transmit a response to the request indicating the determined radio frame configuration, wherein the response indicates an updated radio frame configuration to be used for communicating with the user equipments instead of the determined radio frame configuration.

3. The master base station of claim 1, wherein:
   being configured to cause the master base station to identify further comprises being configured to cause the master base station to identify a common radio frame configuration included in the common sub-codebook, that corresponds to most of the determined radio frame configurations indicated in the requests received from the plurality of slave base stations, and the radio frame configuration of the common sub-codebook is the common radio frame configuration.

4. The master base station of claim 1, wherein being configured to cause the master base station to select comprises being configured to cause the master base station to:
   calculate an average misalignment between the determined radio frame configuration and the radio frame configuration of the common sub-codebook, and
   wherein the at least one memory and the computer program code are configured to, with the at least one processor, cause the master base station to further perform:
   in case the average misalignment between the determined radio frame configuration and the radio frame configuration of the common sub-codebook does not exceed a first predetermined threshold, not transmitting a response to the request indicating the determined radio frame configuration.

5. The master base station of claim 4,
   wherein being configured to cause the master base station to select further comprises being configured to cause the master base station to:
   in case the average misalignment between the determined radio frame configuration and the radio frame configuration of the common sub-codebook exceeds the first predetermined threshold, select a radio frame configuration of the sub-codebook of the determined radio frame configuration, that minimizes an average misalignment with the radio frame configuration of the common codebook; and
   in case an average misalignment between the selected radio frame configuration of the sub-codebook of the determined radio frame configuration and the radio frame configuration of the common codebook does not exceed the first predetermined threshold, update the determined radio frame configuration with the selected radio frame configuration of the sub-codebook of the determined radio frame configuration, and
   wherein the at least one memory and the computer program code are configured to, with the at least one processor, cause the master base station to further:
   transmit a response to the request indicating the determined radio frame configuration, the response indicating, as updated radio frame configuration, the selected radio frame configuration of the sub-codebook of the determined radio frame configuration.

6. A method for use by an master base station of a mobile communication system, the method comprising:
   receiving, from each slave base stations of a plurality of slave base stations of the mobile communication system, which belong to a cluster of the master base station, a request to use a radio frame configuration determined by the slave base stations for communicating with user equipments,
   wherein the determined radio frame configuration is indicated in the request and is one of Q unique radio frame configurations included in a predefined sliding codebook, where Q has a value greater than 1,
   wherein each of the Q unique radio frame configurations comprises subframes for downlink communication with the user equipments and subframes for uplink communication with the user equipments, and
   wherein the predefined sliding codebook comprises sub-codebooks each grouping together radio frame configurations of the Q unique radio frame configurations, that share the same downlink-to-uplink subframe ratio but with a phase offset of the radio frame configurations;
   identifying a common sub-codebook out of the sub-codebooks, that comprises most of the determined radio frame configurations indicated in the requests received from the plurality of slave base stations; and
   for each of the determined radio frame configurations indicated in the requests received from the plurality of slave base stations, selecting, as a response to the request from each slave base station of the plurality of slave base stations, a radio frame configuration out of the Q unique radio frame configurations, that corresponds to a sub-codebook of the determined radio frame configuration and minimizes an average misalignment with a radio frame configuration of the common sub-codebook.

7. The method of claim 6, further comprising:
based on the selected radio fame configuration, transmitting a response to the request indicating the determined radio frame configuration, wherein the response indicates an updated radio frame configuration to be used for communicating with the user equipments instead of the determined radio frame configuration.

8. The method of claim 6, wherein:
the identifying further comprises identifying a common radio frame configuration included in the common sub-codebook, that corresponds to most of the determined radio frame configurations indicated in the requests received from the plurality of slave base stations, and
the radio frame configuration of the common sub-codebook is the common radio frame configuration.

9. The method of claim 6, wherein the selecting comprises:
calculating an average misalignment between the determined radio frame configuration and the radio frame configuration of the common sub-codebook, and
wherein the method further comprises:
in case the average misalignment between the determined radio frame configuration and the radio frame configuration of the common sub-codebook does not exceed a first predetermined threshold, not transmitting a response to the request indicating the determined radio frame configuration.

10. The method of claim 9, wherein the selecting further comprises:
in case the average misalignment between the determined radio frame configuration and the radio frame configuration of the common sub-codebook exceeds the first predetermined threshold, selecting a radio frame configuration of the sub-codebook of the determined radio frame configuration, that minimizes an average misalignment with the radio frame configuration of the common codebook; and
in case an average misalignment between the selected radio frame configuration of the sub-codebook of the determined radio frame configuration and the radio frame configuration of the common codebook does not exceed the first predetermined threshold, updating the determined radio frame configuration with the selected radio frame configuration of the sub-codebook of the determined radio frame configuration, and
wherein the method further comprises:
transmitting a response to the request indicating the determined radio frame configuration, the response indicating, as updated radio frame configuration, the selected radio frame configuration of the sub-codebook of the determined radio frame configuration.

* * * * *